United States Patent
Chino

(10) Patent No.: US 10,475,162 B2
(45) Date of Patent: Nov. 12, 2019

(54) IMAGE PROCESSING DEVICE, METHOD, AND STORAGE MEDIUM FOR GAMMA CORRECTION BASED ON ILLUMINANCE

(71) Applicant: CANON KABUSHIKI KAISHA, Tokyo (JP)

(72) Inventor: Shunsuke Chino, Wako (JP)

(73) Assignee: Canon Kabushiki Kaisha, Tokyo (JP)

( * ) Notice: Subject to any disclaimer, the term of this patent is extended or adjusted under 35 U.S.C. 154(b) by 292 days.

(21) Appl. No.: 15/407,949

(22) Filed: Jan. 17, 2017

(65) Prior Publication Data
US 2017/0213322 A1  Jul. 27, 2017

(30) Foreign Application Priority Data
Jan. 27, 2016  (JP) .................. 2016-013511

(51) Int. Cl.
*G06K 9/46*  (2006.01)
*G06T 5/00*  (2006.01)

(52) U.S. Cl.
CPC ............ *G06T 5/002* (2013.01); *G06K 9/4661* (2013.01)

(58) Field of Classification Search
CPC .............................. G06K 9/4661; G06T 5/002
See application file for complete search history.

(56) References Cited

U.S. PATENT DOCUMENTS

| | | | | |
|---|---|---|---|---|
| 2008/0037868 A1* | 2/2008 | Han | ................ | G06T 5/009 382/169 |
| 2008/0259181 A1* | 10/2008 | Yamashita | ........... | H04N 5/2351 348/229.1 |
| 2011/0074803 A1* | 3/2011 | Kerofsky | ............ | G09G 3/3406 345/589 |
| 2013/0293121 A1* | 11/2013 | Viacheslav | ............. | G09G 3/20 315/158 |
| 2014/0049567 A1* | 2/2014 | Chen | ....................... | G09G 3/36 345/690 |
| 2014/0320552 A1* | 10/2014 | Seo | ...................... | G09G 3/3648 345/690 |
| 2015/0221280 A1* | 8/2015 | Van Der Vleuten | ....................... | H04N 1/6027 382/167 |
| 2015/0243243 A1* | 8/2015 | Greenebaum | ......... | H04N 19/98 345/506 |
| 2018/0139429 A1* | 5/2018 | Park | ...................... | G09G 5/005 |

FOREIGN PATENT DOCUMENTS

| | | |
|---|---|---|
| JP | 2004-363726 A | 12/2004 |
| JP | 2005-236588 A | 9/2005 |

OTHER PUBLICATIONS

Song et al. ("Contrast enhancement algorithm considering surrounding information by illumination image," Journal of Electronic Imaging 23 (5), Sep. 2014) (Year: 2014).*

* cited by examiner

*Primary Examiner* — Yubin Hung
(74) *Attorney, Agent, or Firm* — Canon U.S.A., Inc. I.P. Division

(57) ABSTRACT

An illuminance calculation unit detects an illuminance of an image when the image is captured. Based on the detected illuminance, a gamma correction amount calculation unit corrects at least one of a minimum output luminance value and a maximum output luminance value in a gamma characteristic for correcting a gradation characteristic of a luminance of the image. A gamma setting unit corrects the gradation characteristic of the luminance of the image with the gamma characteristic corrected based on the illuminance.

16 Claims, 18 Drawing Sheets

NOISE LEVEL:54.4
IMAGE AVERAGE LUMINANCE VALUE Y:138.1

NOISE LEVEL:30.5
IMAGE AVERAGE LUMINANCE VALUE Y:147.0

FIG. 7

| | | HIGH LUMINANCE AREA OFFSET AMOUNT | | | | |
|---|---|---|---|---|---|---|
| | | 0 | 16 | 32 | 48 | 64 |
| LOW LUMINANCE AREA OFFSET AMOUNT | 0 | 100.00 | 98.31 | 95.89 | 93.00 | 89.37 |
| | 16 | 98.31 | 96.14 | 93.00 | 89.86 | 86.96 |
| | 32 | 96.14 | 93.00 | 89.86 | 86.47 | 84.06 |
| | 48 | 92.75 | 89.86 | 86.71 | 83.09 | 79.71 |

FIG. 12

| GAIN[dB] | OFFSET AMOUNT | |
| --- | --- | --- |
| | HIGH LUMINANCE AREA | LOW LUMINANCE AREA |
| 0 | 0 | 0 |
| 6 | 0 | 0 |
| 12 | 0 | 0 |
| 18 | 8 | 8 |
| 24 | 16 | 16 |
| 30 | 24 | 24 |
| 36 | 32 | 32 |
| 42 | 40 | 32 |
| 48 | 48 | 32 |
| 54 | 56 | 32 |
| 60 | 64 | 32 |

FIG. 18

| GAIN[dB] | LUMINANCE RANGE CHANGE RATIO(%) |
|---|---|
| 0 | 100 |
| 6 | 100 |
| 12 | 100 |
| 18 | 94 |
| 24 | 88 |
| 30 | 81 |
| 36 | 75 |
| 42 | 69 |
| 48 | 63 |
| 54 | 56 |
| 60 | 50 |

IMAGE PROCESSING DEVICE, METHOD, AND STORAGE MEDIUM FOR GAMMA CORRECTION BASED ON ILLUMINANCE

BACKGROUND OF THE INVENTION

Field of the Invention

The present invention relates to an image processing device, an image processing method, and a storage medium.

Description of the Related Art

Monitoring cameras are required to capture images both day and night, meaning that images need to be captured even under low illuminance condition. Generally, images captured under low illuminance condition are adjusted to have a gain increased by automatic gain control (AGC).

Japanese Patent Application Laid-Open No. 2005-236588 discusses a technique for converting a minimum conversion luminance value and a maximum conversion luminance value into a luminance range of an output image, with an intermediate conversion luminance value set to be on a center side of the dynamic range. The minimum conversion luminance value has a predetermined value close to 0% in a luminance histogram. The intermediate conversion luminance value has a predetermined value at or around 50% in the luminance histogram. The maximum conversion luminance value has a predetermined value close to 100% in the luminance histogram. Japanese Patent Application Laid-Open No. 2004-363726 discusses a technique for executing gradation value conversion processing, based on a gradation conversion characteristic selected in accordance with the luminance value from a plurality of gradation conversion characteristics prepared. The gradation conversion characteristics feature nonlinear change in output-input characteristics of gradation values.

An image obtained by the adjustment to increase the gain of the image captured under low illuminance results in an image that is brighter but is likely to become a low image quality having a large amount of noise. The large amount of noise negatively affects the compression performance of an encoder that performs compression based on H.264 standard and the like, resulting in an increase in the data size of an image. The monitoring cameras are required to record and store data for a long period of time, and thus such increase in the data size requires a recording medium with a large capacity leading to an increased introduction cost. However, for example, it is expected that an image captured under low illuminance condition can be adjusted with reduced image degradation while resultant increase in the data size of the image is prevented, if the noise and the entropy of the image are reduced in accordance with the illuminance condition at the time when the image is captured. The techniques discussed in Japanese Patent Application Laid-Open No. 2005-236588 and Japanese Patent Application Laid-Open No. 2004-363726 described above can achieve a luminance range of an output image wider than that of an input image, but cannot prevent the increase in the data size of the image while restraining image degradation.

SUMMARY OF THE INVENTION

According to an aspect of the present invention, an image processing device includes an illuminance detection unit, a gamma correction unit, and a processing unit, the illuminance detection unit detects an illuminance of an image when the image is captured, wherein based on the detected illuminance, the gamma correction unit corrects at least one of a minimum output luminance value and a maximum output luminance value of a gamma characteristic for correcting a gradation characteristic of a luminance of the image, and the processing unit corrects the gradation characteristic of the luminance of the image with the gamma characteristic corrected based on the illuminance.

Further aspects and features of the present invention will become apparent from the following description of exemplary embodiments with reference to the attached drawings.

BRIEF DESCRIPTION OF THE DRAWINGS

FIG. 7 is a table illustrating an example of a data size reduction with correction in the first exemplary embodiment.

FIG. 12 is a table illustrating offset amounts corresponding to gains.

FIG. 18 is a table illustrating luminance range change ratios corresponding to various gains.

DESCRIPTION OF THE EMBODIMENTS

Exemplary embodiments of the present invention are described with reference to the drawings.

Figure 1:
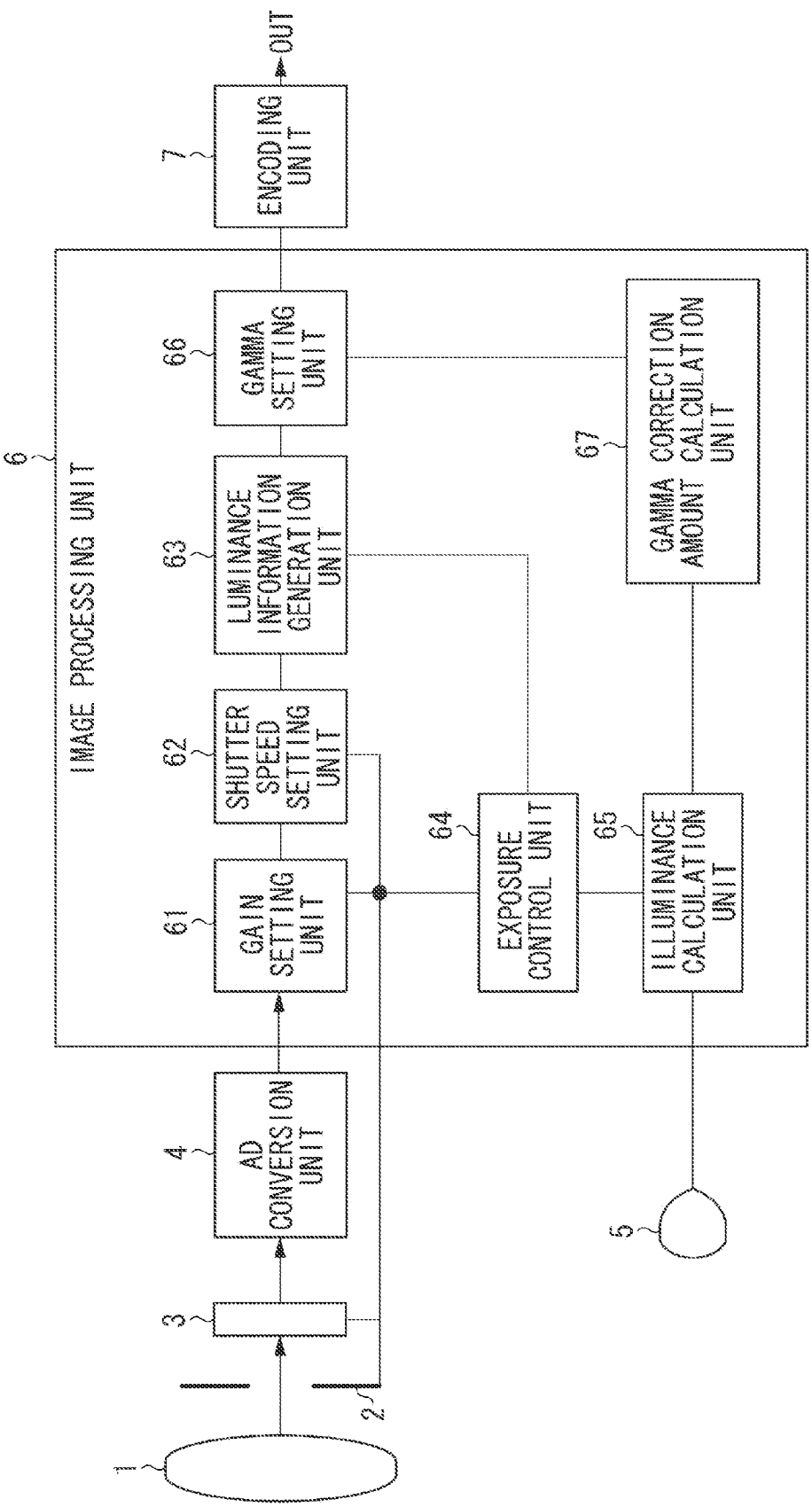
FIG. 1 is a block diagram illustrating an example of a schematic configuration of an image processing device according to a first exemplary embodiment.

A first exemplary embodiment of the present invention is described below. FIG. 1 is a diagram illustrating an example of a schematic configuration of an image processing device according to the present exemplary embodiment. The image processing device illustrated in FIG. 1 can be installed in various cameras such as a monitoring camera and a camera installed in smartphones and the like. A lens group 1 illustrated in FIG. 1 includes a focus lens performing in-focus position adjustment and a zoom lens performing focal length adjustment. For example, a diaphragm 2 is used for adjusting the amount of light incident on an image sensor 3 via the lens group 1. The image sensor 3 converts an optical image formed on an imaging plane via the lens group 1 and the diaphragm 2 into an analog image signal. An analog-digital (AD) conversion unit 4 converts the analog image signal output from the image sensor 3 into digital image data. The image data output from the AD conversion unit 4 is input to an image processing unit 6. An illuminance meter 5 measures an illuminance on an object and the like when the image is captured, and outputs the resultant illuminance data to the image processing unit 6.

When exposure control is performed in the image processing unit 6 in accordance with the object, a gain setting unit 61 performs gain control on the image data from the AD conversion unit 4. Increased gain can achieve a brighter image of the object but causes more noise in the image. A shutter speed setting unit 62 controls shutter speed so as to achieve an appropriate brightness of the image of the object, based on the image data. A luminance information generation unit 63 generates information about luminance Y of each pixel based on the image data, for example. An exposure control unit 64 control a diaphragm value of the diaphragm 2, the gain set by the gain setting unit 61, and the shutter speed set by the shutter speed setting unit 62, based on the information about the luminance Y generated by the luminance information generation unit 63, to achieve an appropriate value of the luminance of the object, for example. An illuminance calculation unit 65 is an example of an illuminance detection unit configured to detect, for example, the illuminance of the object when the image is captured. The illuminance calculation unit 65 calculates the illuminance level of the object and the like being captured, based on at least one of the illuminance data from the illuminance meter 5, the diaphragm value of the diaphragm 2, the gain set by the gain setting unit 61, the shutter speed set by the shutter speed setting unit 62, and the information about the luminance Y from the luminance information generation unit 63. The illuminance information calculated by the illuminance calculation unit 65 is sent to a gamma correction amount calculation unit 67.

Figure 2:
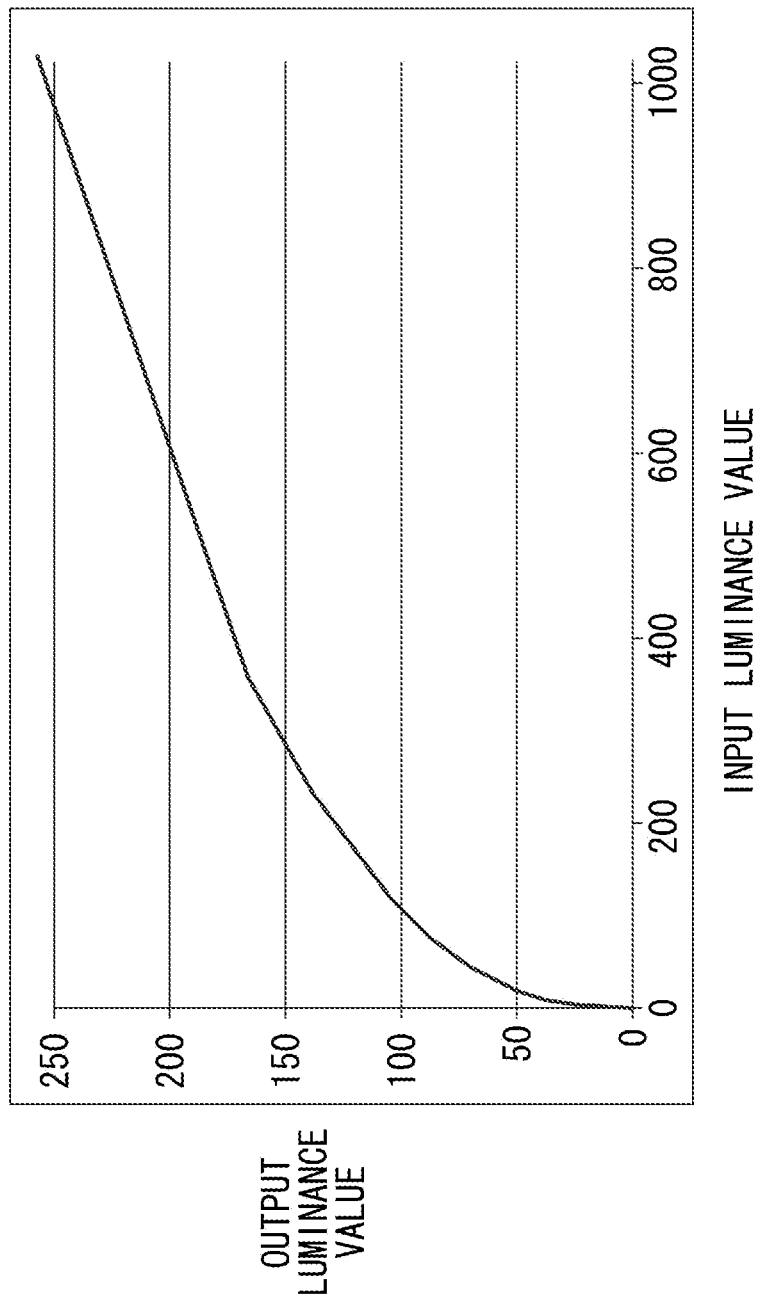
FIG. 2 is a graph illustrating an example of a reference gamma characteristic.

A gamma setting unit 66 corrects a gradation characteristic of the luminance of the image from the luminance information generation unit 63. More specifically, the gamma setting unit 66 is an example of a processing unit that corrects the gradation characteristic of the image, through gamma processing. In the gamma processing, an output luminance value is obtained by correcting an input luminance value as the luminance of the image in accordance with what is known as a gamma characteristic. A general example of the gamma characteristic is illustrated in FIG. 2. In FIG. 2, the horizontal axis represents the input luminance value and the vertical axis represents the output luminance value. The gamma characteristic affects the contrast and gradation of the image, and thus has a large influence on the image quality. The gamma correction amount calculation unit 67 is an example of a correction unit, and corrects at least either one of a minimum output luminance value and a maximum output luminance value in the correction characteristic for correcting the gradation characteristic of the luminance of the image, in accordance with the detected illuminance. In the present exemplary embodiment, the gamma correction amount calculation unit 67 calculates the correction amount with respect to the gamma characteristic, in accordance with the illuminance information calculated by the illuminance calculation unit 65, and causes the gamma setting unit 66 to set the gamma characteristic as a result of correction with the correction amount. As described above, in the present exemplary embodiment, the gamma setting unit 66 executes the gamma processing based on the gamma characteristic corrected in accordance with the illuminance information, to correct the gradation characteristic of the image. The correction amount for the gamma characteristic and the gamma processing based on the gamma characteristic as a result of the correction with the correction amount are described in detail below. An encoding unit 7 encodes, for example, a still image based on a standard such as Joint Photographic Experts Group (JPEG) and encodes a moving image based on a standard such as Moving Picture Experts Group (MPEG) or H.264.

The image including a large amount of noise increases high-frequency components in encoding, leading to degraded compression performance and a larger data size after the compression. It is helpful to reduce the noise and the entropy of the image to prevent the data size of the image from increasing. To that end, in the present exemplary embodiment, the luminance range is corrected in a manner described below, so that the noise is reduced to prevent the data size from increasing while the image degradation is reduced. In the present exemplary embodiment, the luminance range is corrected by the gamma characteristic being corrected as described above. In the present exemplary embodiment, the gamma characteristic is corrected by offsetting at least either one of the minimum output luminance value and the maximum output luminance value in the gamma characteristic serving as a reference. Thus, the offset amount of the gamma characteristic serving as the reference corresponds to the correction amount on the gamma characteristic described above.

The correction with respect to the reference gamma characteristic through the offsetting and the correction of the luminance range based on correction of the gamma characteristic are described in detail below. In the present exemplary embodiment, the luminance range is corrected as follows. Specifically, the gamma correction amount calculation unit 67 calculates the correction amount (offset amount) for the gamma characteristic based on the illuminance information from the illuminance calculation unit 65, and the gamma setting unit 66 is caused to set the gamma characteristic as a result of the correction based on the correction amount.

Figure 3:
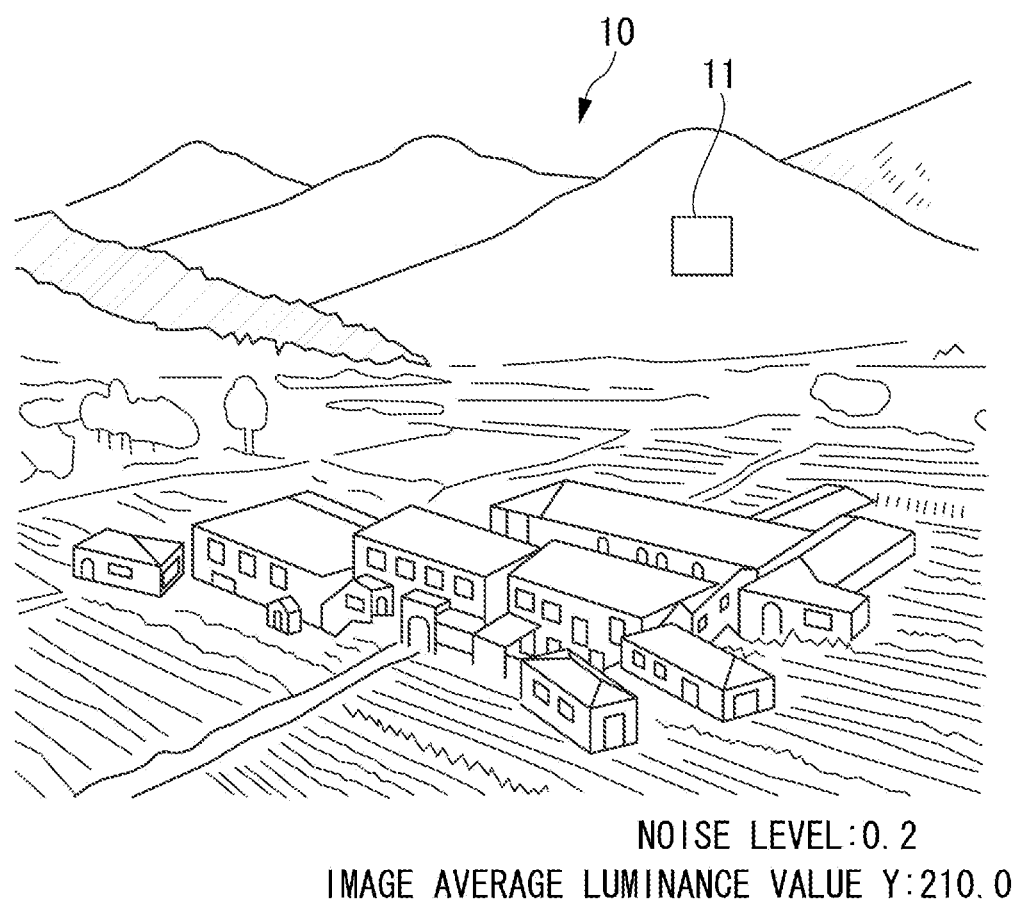
FIG. 3 is a diagram illustrating an example of a sufficient illuminance image.
Figure 4:
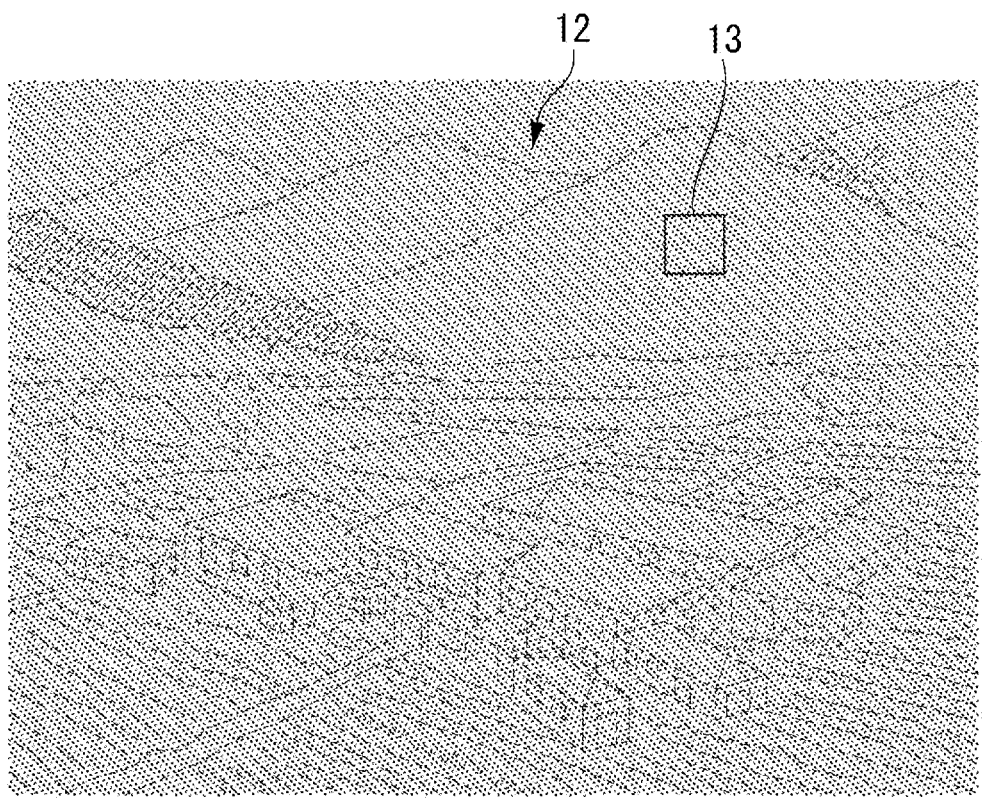
FIG. 4 is a diagram illustrating an example of a low illuminance image.

FIG. 3 illustrates an example of a sufficient illuminance image 10. FIG. 4 illustrates an example of a low illuminance image 12. A square portion 11 in FIG. 3 and a square portion 13 in FIG. 4 each represent an area in which the noise level is measured. An image average luminance value Y illustrated in FIGS. 3 and 4 is an average value of the luminance Y across the entire image. Each of the values of the noise level and the image average luminance illustrated in FIGS. 3 and 4 is a reference value. Here, for example, the gain setting unit 61 performs the adjustment to increase the gain on the low illuminance image 12 illustrated in FIG. 4. Accordingly, the noise level becomes much higher in the low illuminance image 12 illustrated in FIG. 4 than in the sufficient illuminance image 10 illustrated in FIG. 3.

Figure 5:
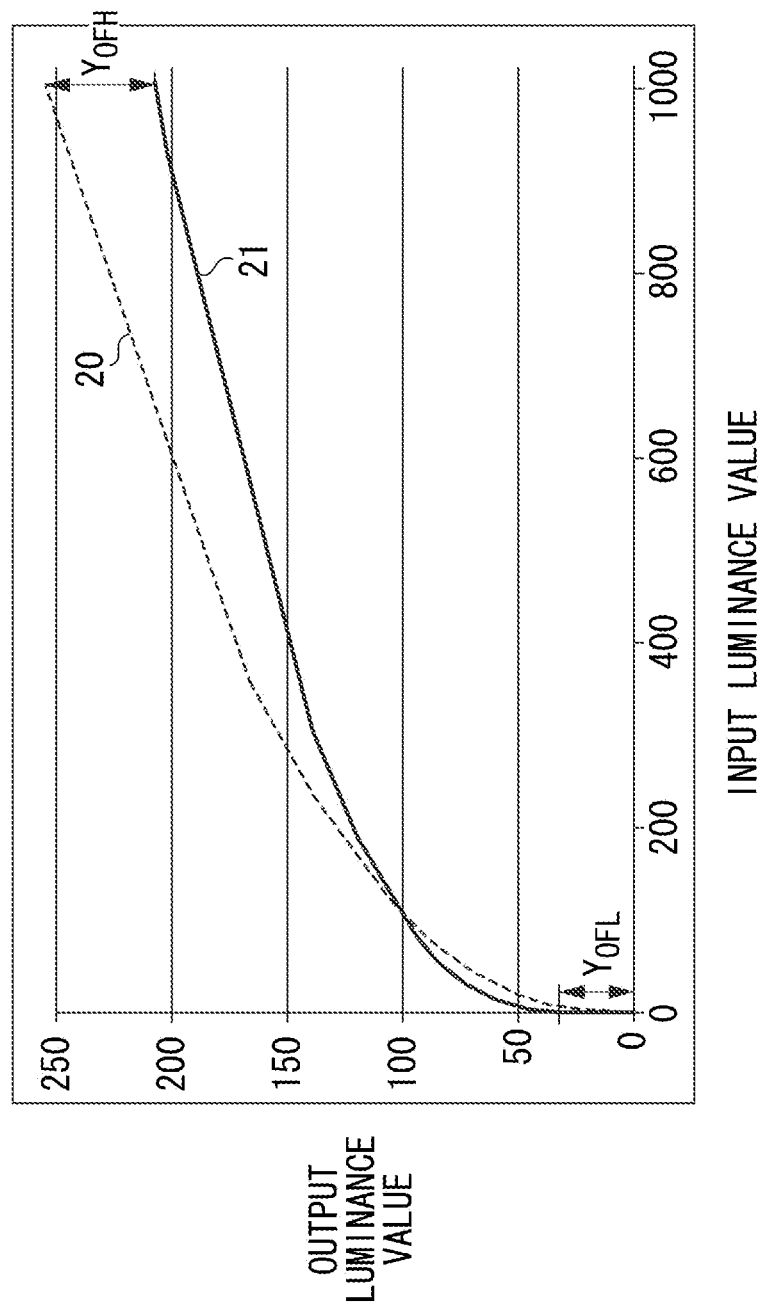
FIG. 5 is a graph illustrating an example of corrected and uncorrected gamma characteristics according to the first exemplary embodiment.

In the present exemplary embodiment, gamma processing with a gamma characteristic 21 as illustrated in FIG. 5 is executed on the low illuminance image 12 exemplarily illustrated in FIG. 4. FIG. 5 illustrates a gamma characteristic 20 that is the gamma characteristic illustrated in FIG. 2 and used as a reference for obtaining the gamma characteristic 21. The gamma characteristic 21 is obtained by, with respect to the reference gamma characteristic 20, offsetting the minimum output luminance value by a first offset amount YOFL, offsetting the maximum output luminance value by a second offset amount YOFH, and interpolating an intermediate luminance value area between the minimum output luminance value and the maximum output luminance value. The first offset amount YOFL is set as such an offset amount that increases the minimum output luminance value of the reference gamma characteristic 20 by a first predetermined amount. The second offset amount YOFH is set as such an offset amount that reduces the maximum output luminance value of the reference gamma characteristic 20 by a second predetermined amount. For example, in the present exemplary embodiment, the first offset amount YOFL corresponds to a luminance value of 16, and the second offset amount YOFH corresponds to a luminance value of 64. The gamma characteristic 21 may be also obtained by combining the reference gamma characteristic 20 with a characteristic represented by a straight line connecting the minimum output luminance value after the offsetting by the first offset amount YOFL with the maximum output luminance value after the offsetting by the second offset amount YOFH.

The following Formula (1) represents a formula for the gamma processing based on the gamma characteristic 21.

$$YOUT=(255-YOFL-YOFH)\times\gamma(YIN)/255+YOFL \quad \text{Formula (1)},$$

where YOUT represents the output luminance value, YIN represents the input luminance value, and γ( ) represents a function corresponding to the reference gamma characteristic 20 illustrated in FIG. 2.

Figure 6:
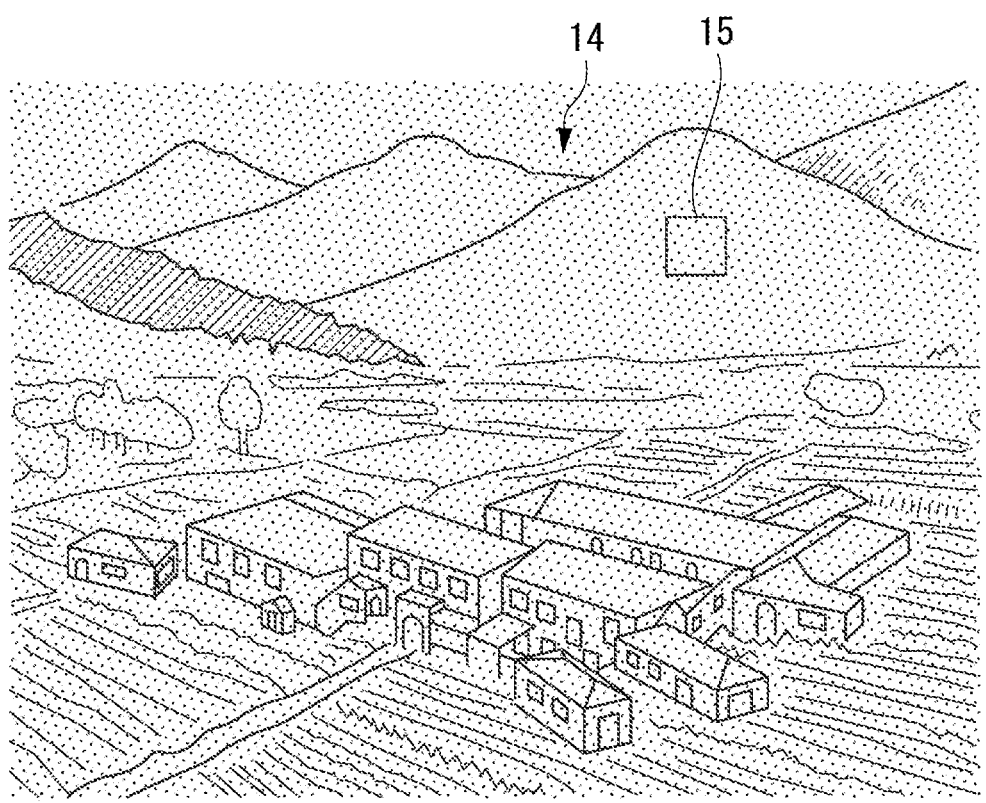
FIG. 6 is a diagram illustrating an example of the low illuminance image after gamma processing with the corrected gamma characteristic.

FIG. 6 illustrates an example of an image 14 obtained by executing the gamma processing with the gamma characteristic 21 illustrated in FIG. 5 on the example image illustrated in FIG. 4 described above. A square portion 15 in FIG. 6 corresponds to the area 13 in FIG. 4. It can be seen in the example illustrated in FIG. 6 that the image as a whole has increased luminance to appear as a brighter image, and the noise level is reduced with the image quality such as gradation being prevented from degrading, compared with the image 12 exemplarily illustrated in FIG. 4. The noise level is reduced so that the data size after the encoding by the encoding unit 7 is reduced compared with the case of the image exemplarily illustrated in FIG. 4. FIG. 7 illustrates an example of how much the data size after the encoding is reduced in an image captured in a certain scene, as a result of correcting the luminance range with the gamma characteristic corrected as described above. More specifically, FIG. 7 illustrates a ratio of a data size in a case where the offset amount for high and low luminance areas is "16 to 64" to a data size in a case where no correction is performed. The data size is 100% when the offset amount for both high and low luminance areas is 0 (no correction). It can be seen in this example illustrated in FIG. 7 that the data size decreases with an increase in the offset amount for both high and low luminance areas in the gamma characteristic (the correction amount for the luminance range).

Figure 8:
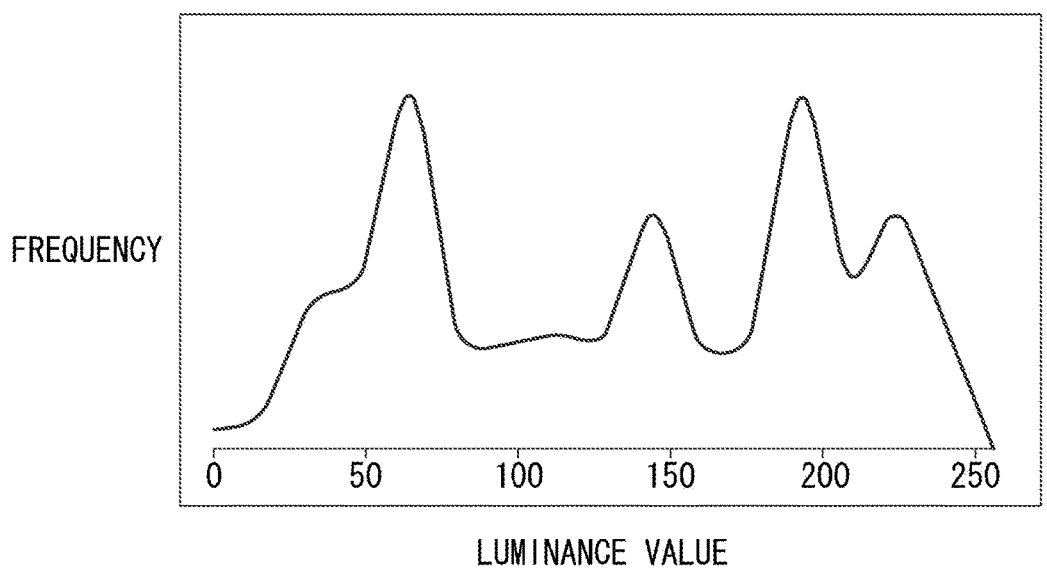
FIG. 8 is a graph illustrating an example of a histogram of the sufficient illuminance image.
Figure 9:
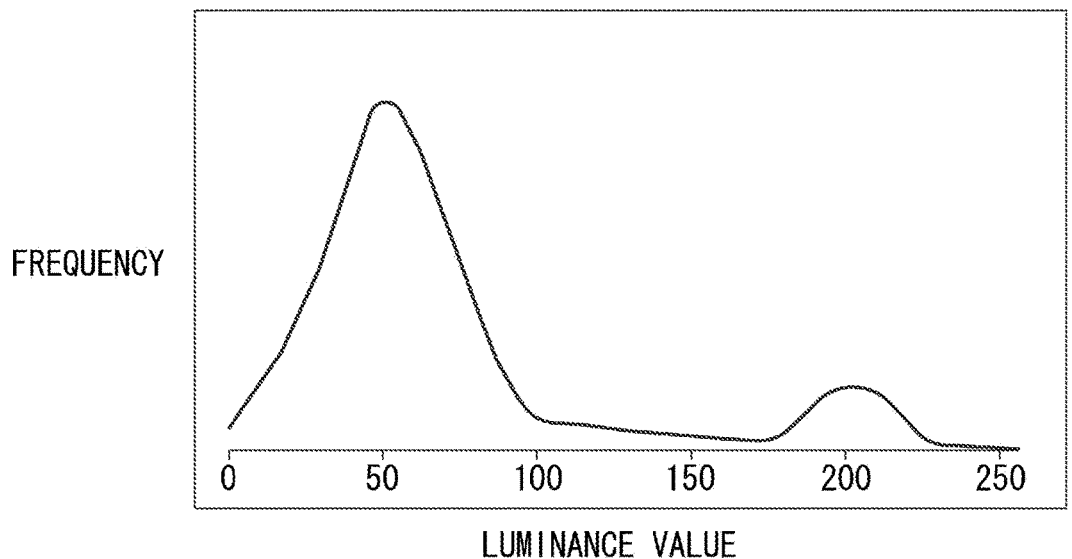
FIG. 9 is a graph illustrating an example of a histogram of the low illuminance image.

FIG. 8 illustrates an example of a histogram of the sufficient illuminance image as exemplarily illustrated in FIG. 3. FIG. 9 illustrates an example of a histogram of the low illuminance image as exemplarily illustrated in FIG. 4. In FIGS. 8 and 9, the horizontal axis represents a luminance value, and the vertical axis represents a frequency of pixels. It can be seen in the histogram exemplarily illustrated in FIG. 8 that the sufficient illuminance image has luminance values distributed across the entire luminance range. On the other hand, it can be seen in the histogram exemplarily illustrated in FIG. 9 that the low illuminance image has luminance values distributed more on a low luminance side than on a high luminance side, in comparison with the example illustrated in FIG. 8. Examples of such an image with the luminance values distributed more on the low luminance side include the image captured in a low illuminance environment as described above, and further include an image captured with a low gain set and an image obtained with exposure adjustment for setting low exposure to appear as a low illuminance captured image.

As described above, the histogram exemplarily illustrated in FIG. 9 represents an image with the luminance values distributed more on the low luminance side and less distributed on the high luminance side. For example, the image quality of such an image is considered to be not largely affected by correction on the luminance range more focusing on the high luminance side than the low luminance side. Since the high luminance area and the low luminance area both involve noise, the noise level reduction effect can be more effectively increased with the image quality prevented from degrading, with the correction amount set to be larger in the high luminance area than in the low luminance area. Accordingly, in the present exemplary embodiment, the correction of the luminance range is more focused on the high luminance area than on the low luminance area, as described above with reference to FIG. 5.

Figure 10:
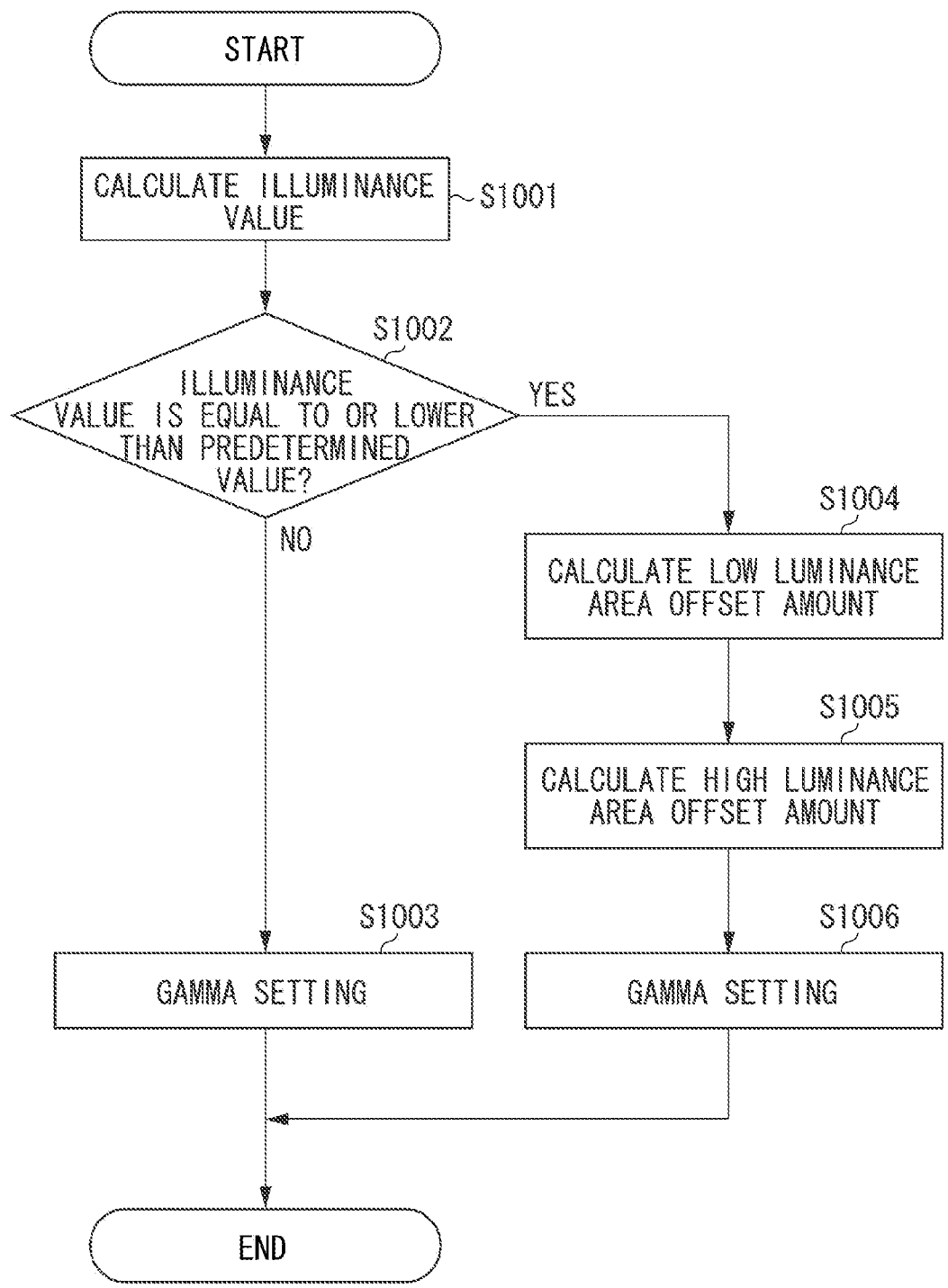
FIG. 10 is a flowchart according to the first exemplary embodiment.

FIG. 10 is a flowchart illustrating processing in the image processing unit 6. The processing in the flowchart illustrated in FIG. 10 is executed by the illuminance calculation unit 65, the gamma correction amount calculation unit 67, and the gamma setting unit 66. For example, the processing illustrated in FIG. 10 may be implemented by a central processing unit (CPU) executing an image processing program according to the present exemplary embodiment.

After a camera starts capturing an image, the image processing unit 6 starts the processing in the flowchart illustrated in FIG. 10, and the processing proceeds to step S1001. In step S1001, the illuminance calculation unit 65 calculates the illuminance of the object and the like in the captured image, based on at least one of the illuminance data, the diaphragm value, the set gain, the set shutter speed, and the luminance value Y as described above. After the processing in step S1001 is completed, the processing proceeds to step S1002.

In step S1002, the gamma correction amount calculation unit 67 determines whether the illuminance value calculated by the illuminance calculation unit 65 is equal to or lower than a first illuminance value (Yth1). In a case where the gamma correction amount calculation unit 67 determines that the illuminance value is equal to or lower than the first illuminance value (Yth1) (YES in step S1002), the processing proceeds to step S1004. On the other hand, in a case where the gamma correction amount calculation unit 67 determines that the illuminance value is higher than the first illuminance value (Yth1) (NO in step S1002), the processing proceeds to step S1003. In step S1003, the gamma correction amount calculation unit 67 causes the gamma setting unit 66 to set the reference gamma characteristic 20 described above with reference to FIG. 5. After the processing in step S1003 is completed, the processing in the flowchart in FIG. 10 is terminated.

In step S1004, the gamma correction amount calculation unit 67 calculates the above-described offset amount YOFL for the low luminance area in accordance with the illuminance, and then the processing proceeds to step S1005. In step S1005, the gamma correction amount calculation unit 67 calculates the above-described offset amount YOFH for the high luminance area in accordance with the luminance, and then the processing proceeds to step S1006. In step S1006, the gamma correction amount calculation unit 67 offsets the reference gamma characteristic 20 with the offset amount YOFL for the low luminance area and the offset amount YOFH for the high luminance area, and interpolates the intermediate luminance area, so that the gamma characteristic 21 described above is calculated. The gamma correction amount calculation unit 67 causes the gamma setting unit 66 to set the gamma characteristic 21. In this manner, the gamma setting unit corrects the luminance range of the low illuminance image with the gamma characteristic 21. After the processing in step S1006 is completed, the processing in the flowchart in FIG. 10 is terminated.

Figure 11:
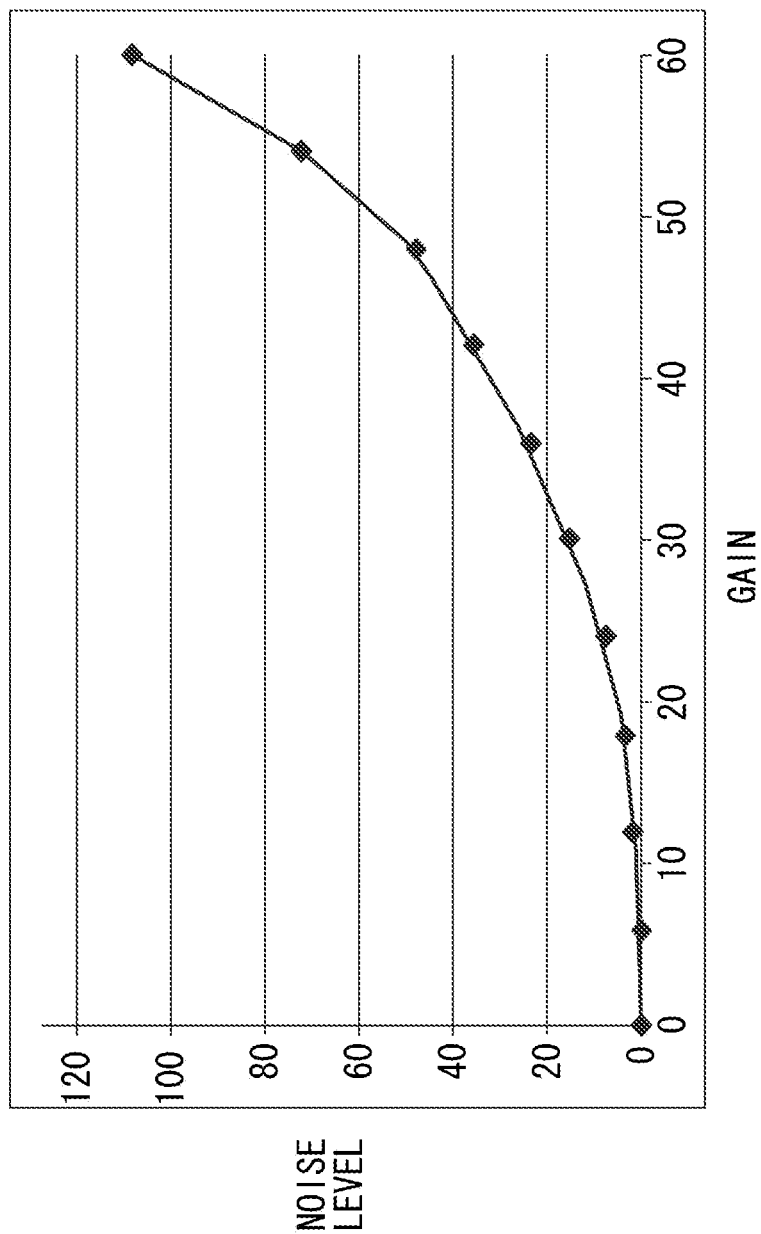
FIG. 11 is a graph illustrating an example of relationship between a gain and noise.

FIG. 11 is a diagram illustrating an example of a relationship between the noise level of an image and the gain for the image. In FIG. 11, the horizontal axis represents the gain, and the vertical axis represents the noise level. It can be seen in FIG. 11 that as the gain increases, the noise level increases. As described above, a higher noise level leads to a larger data size after the encoding, and thus as the gain increases, the data size increases. FIG. 12 is a diagram illustrating a relationship between gains and the offset amounts for the high and the low luminance areas described above. As described above with reference to FIG. 7, a larger offset results in a more reduced data size, and the image quality is not largely affected with the offset amount set to be larger for the high luminance area than for the low luminance area. Accordingly, as illustrated in FIG. 12, the data size can be effectively prevented from increasing with the image quality prevented from degrading, with the offset amount increased as the gain increases and set to be larger for the high luminance area than for the low luminance area. In this manner, in the present exemplary embodiment, the offset amount suitable for an increased gain is obtained, while taking balance with the image quality degradation.

Figure 13:
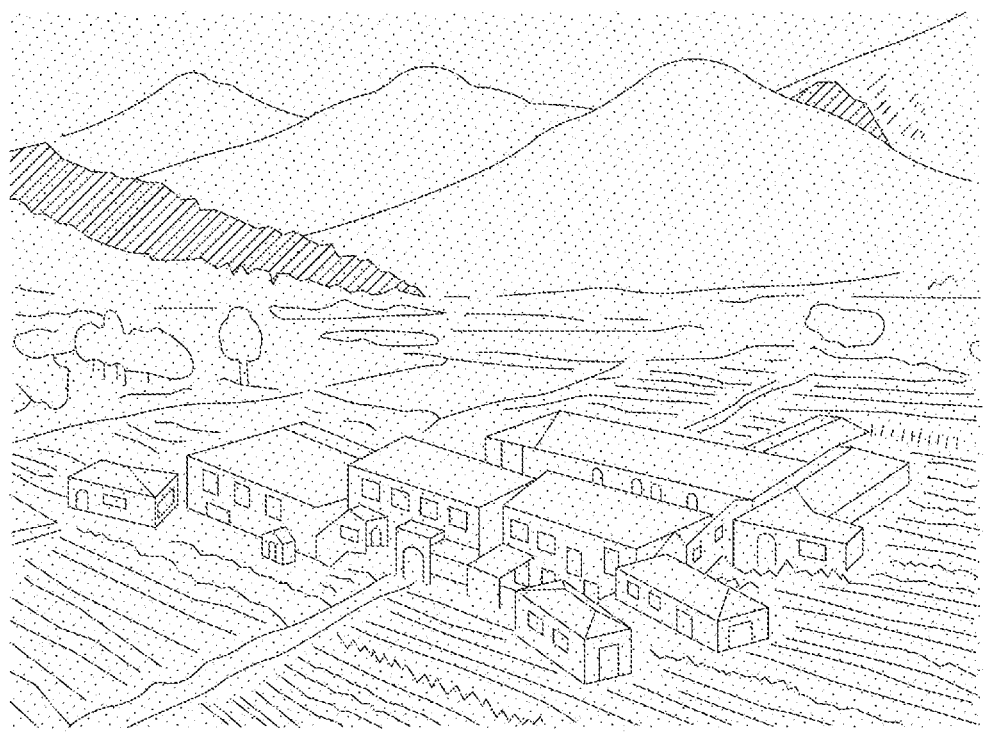
FIG. 13 is a diagram illustrating an example of an image as a result of excessively offsetting a low luminance area.

FIG. 13 illustrates an example of an image that has come out too white a whole as a result of, for example, increased black level in the image caused by excessive raise of the luminance range in the low luminance area. As illustrated in FIG. 13, the luminance range excessively raised in the low luminance area results in the image that is too white as a whole. Thus, the offset amount for the low luminance side is preferably set to be equal to or smaller than a predetermined value set in accordance with image quality and scenes. In the present exemplary embodiment, to prevent the image from being too white, a second illuminance value (Yth2) is set to be used in changing of values for the high luminance area and the low luminance area. More specifically, in the present exemplary embodiment, the same offset amount is set for both the high luminance area and the low luminance area as long as the illuminance value does not drop below the first illuminance value (Yth1). In a case where the illuminance value is lower (gain is higher), a larger offset amount is set for the high luminance area than that for the low luminance area. In the present exemplary embodiment, the offset amount for the high luminance area is set to be larger than that for the low luminance area in a case where the illuminance value drops to or below the second illuminance value (Yth2). There is a correlation between the gain and the illuminance, in which the lower illuminance raises the gain. Accordingly, as illustrated in FIG. 12, the offset amount may be set in accordance with the gain. The increased gain leads to lower image quality due to noise reduction and the like. Thus, in a case where the gain increases, the image quality is not largely affected by an increased offset amount. FIG. 12 illustrates an example where the gain of 36 (dB) corresponds to the illuminance with the second illuminance value (Yth2). The offset amount for the high luminance area is larger than that for the low luminance area under a lower illuminance condition corresponding to the gain exceeding 36 (dB).

As described above, the image processing device according to the present exemplary embodiment corrects the luminance range by executing the gamma processing with a gamma characteristic offset in accordance with the illuminance. In this manner, noise reduction can be achieved so that the data size can be reduced with the image quality prevented from degrading.

Figure 14:
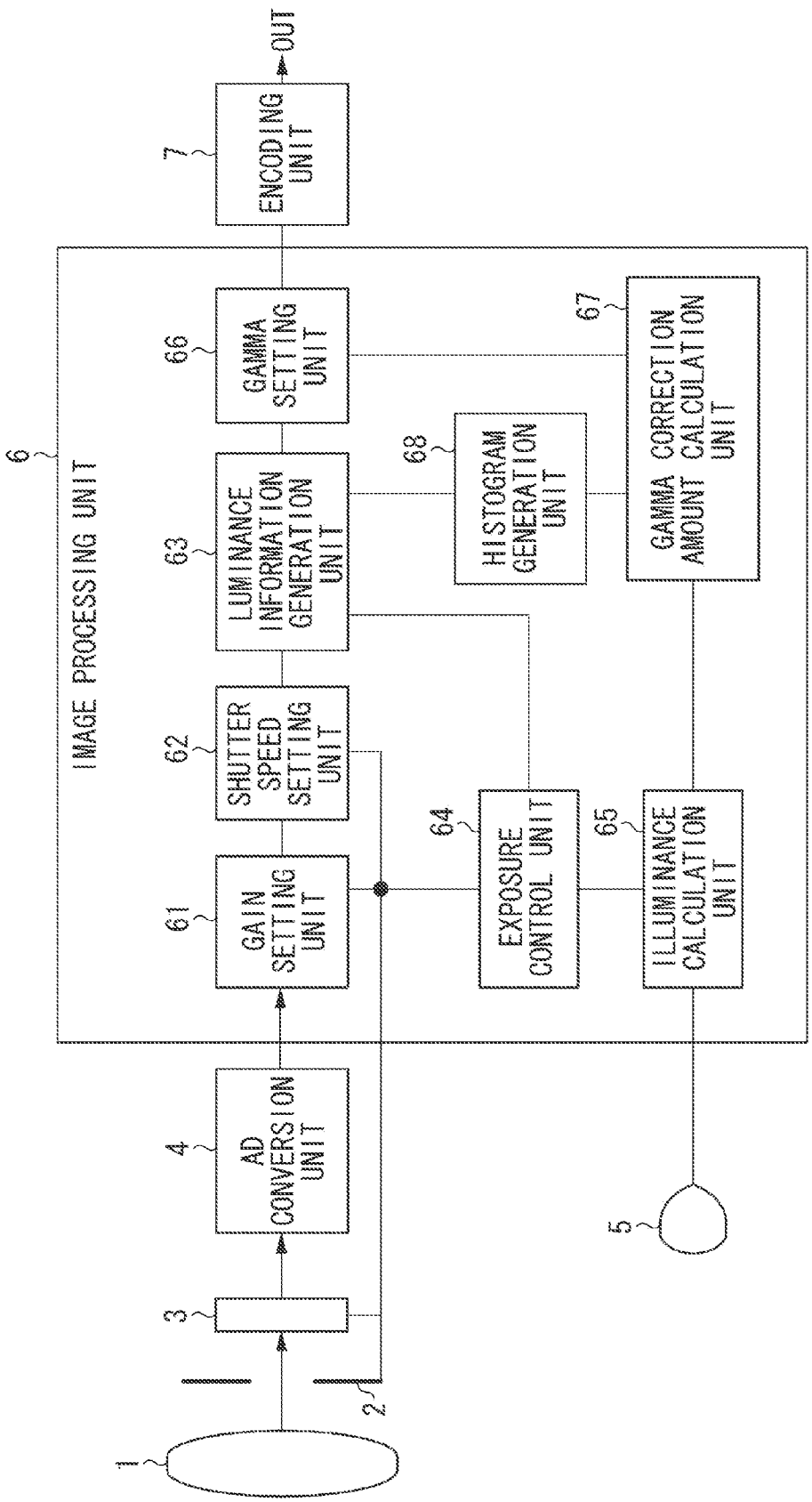
FIG. 14 is a block diagram illustrating an example of a schematic configuration of an image processing device according to a second exemplary embodiment.

A second exemplary embodiment of the present invention is described below. FIG. 14 is a diagram illustrating a schematic configuration of an image processing device according to the present exemplary embodiment. Components in FIG. 14 that are the same as the counterparts in FIG. 1 are denoted with the same reference numerals, and the description thereof is omitted. Only the difference from the configuration illustrated in FIG. 1 is described below. The image processing device illustrated in FIG. 14 has a histogram generation unit 68 additionally provided in the configuration illustrated in FIG. 1 described above. The luminance information generation unit 63 sends the information about the luminance Y also to the histogram generation unit 68.

The histogram generation unit 68 calculates a histogram of the luminance in an image based on the information about the luminance Y from the luminance information generation unit 63. For example, the histogram generation unit 68 generates the histogram illustrated in FIG. 8 or FIG. 9. The histogram generated by the histogram generation unit 68 is sent to the gamma correction amount calculation unit 67. Accordingly, in the present exemplary embodiment, the gamma correction amount calculation unit 67 calculates the correction amount (offset amount) for the gamma characteristic, based on the histogram and the illuminance information from the illuminance calculation unit 65 described above. The gamma correction amount calculation unit 67 sets the gamma characteristic corrected with the correction amount, to the gamma setting unit 66.

Processing executed by the gamma correction amount calculation unit 67 according to the present exemplary embodiment is described below in detail. In the present exemplary embodiment, the gamma correction amount calculation unit 67 calculates an effective range of the luminance from the histogram, and determines a luminance range change ratio in accordance with the illuminance or the gain set in accordance with the illuminance. Then, the gamma correction amount calculation unit 67 determines the correction amount for the gamma characteristic based on the luminance range change ratio.

An example of calculation for the gamma characteristic correction amount by the gamma correction amount calculation unit 67 according to the present exemplary embodiment is described with reference to a histogram illustrated in FIG. 15. The histogram illustrated in FIG. 15 is similar to the histogram of the low luminance image illustrated in FIG. 9 described above.

Figure 15:
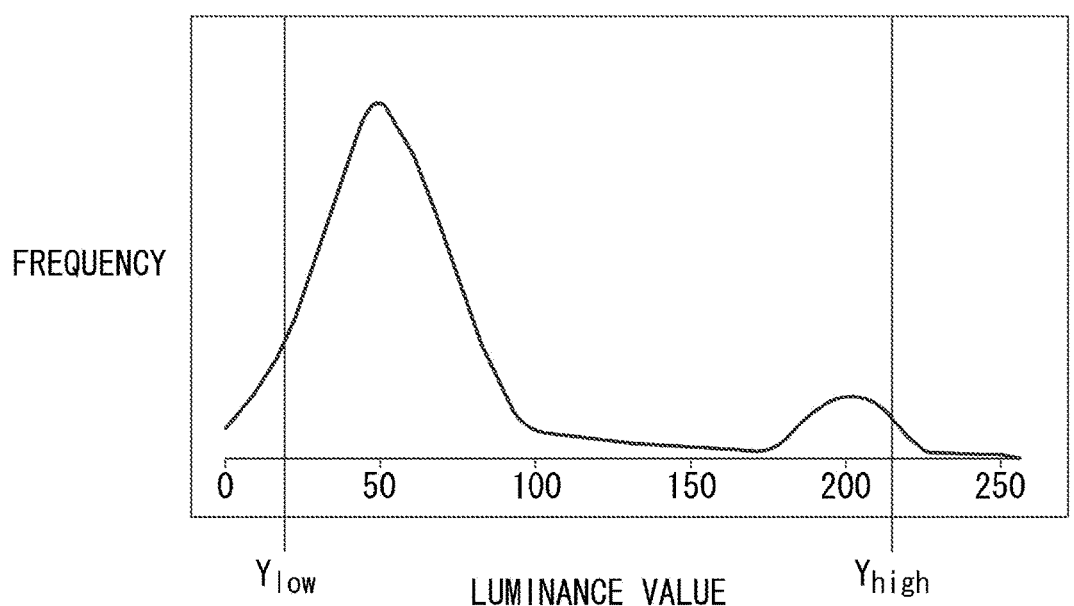
FIG. 15 is a graph illustrating effective luminance.

The gamma correction amount calculation unit 67 calculates a cumulative frequency from a lower luminance side in the histogram illustrated in FIG. 15, and sets low effective luminance value Ylow as a value of the luminance Y at which the cumulative frequency Ilow from the low luminance side reaches a first frequency value. The gamma correction amount calculation unit 67 sets high effective luminance value Yhigh as a value of the luminance Y at which the cumulative frequency Ihigh from the high luminance side reaches a second frequency value, as illustrated in FIG. 15. The first frequency value of the cumulative frequency Ilow for obtaining the low effective luminance value Ylow and the second frequency value of the cumulative frequency Ihigh for obtaining the high effective luminance value Yhigh may be of different values depending on characteristics of the image. For example, when a light source is located in the field of view, and the image, with low illuminance, includes a local high luminance portion (local bright portion), the local high luminance portion may be excluded from the low luminance image so that correction tailored for a main object can be achieved. In such a case, the cumulative frequency Ihigh of the high luminance area is calculated with the frequency of the local high luminance portion corresponding to the lighting being excluded.

The gamma correction amount calculation unit 67 determines a luminance range change ratio Δratio corresponding to the illuminance information (i.e., gain) from a plurality of luminance range change ratios Δratio set in accordance with various gains. As described with reference to FIG. 11, the noise level increases as the gain increases. Accordingly, it is considered that the luminance range can be appropriately corrected with a higher luminance range change ratio set based on an increase of the gain. As described above, the gain and the illuminance information are highly correlated with each other, so that the luminance range change ratio may be obtained in accordance with the illuminance information.

The following Formula (2) represents calculation for the gamma processing according to the present exemplary embodiment.

$$YOUT = (255 - Ylow - Yhigh) \times \Delta ratio / 100 \times \gamma(YIN) / 255 + Ylow \quad \text{Formula (2),}$$

where YOUT represents the output luminance value, YIN represents the input luminance value, and γ( ) represents function corresponding to the reference gamma characteristic 20 illustrated in FIG. 2.

Figure 16:
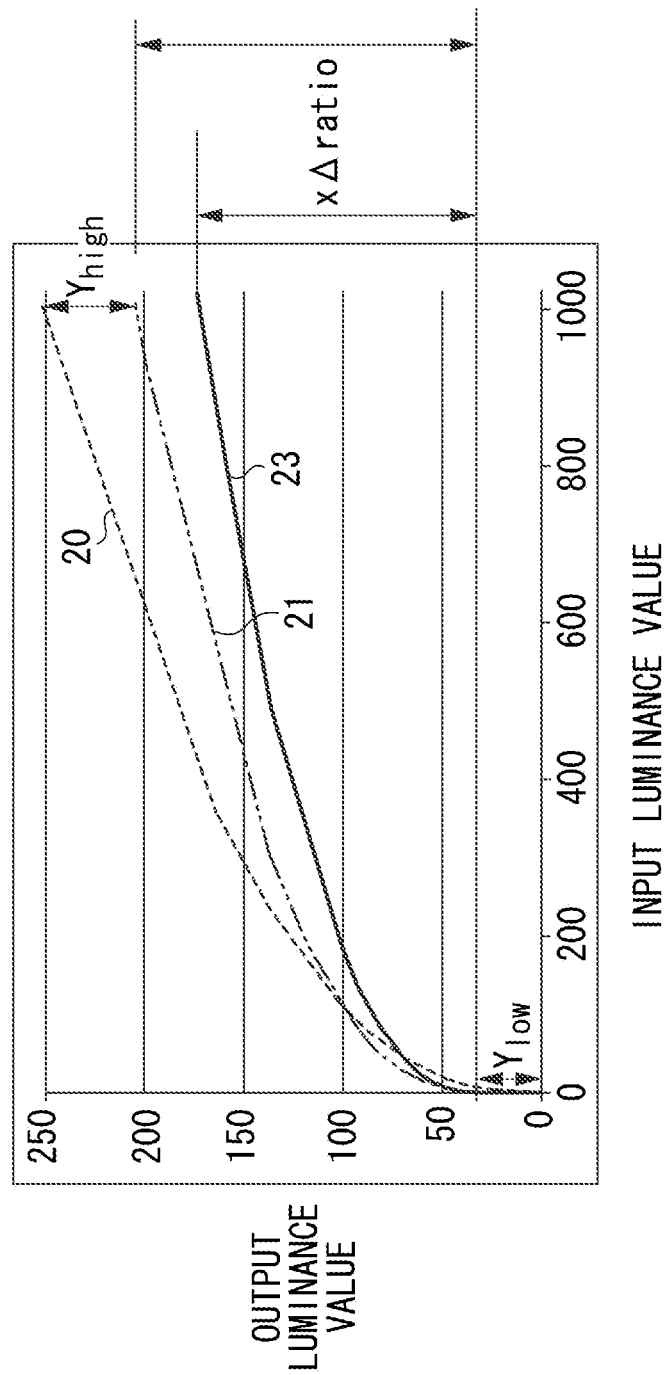
FIG. 16 is a graph illustrating an example of corrected and uncorrected gamma characteristics according to the second exemplary embodiment.

FIG. 16 illustrates the reference gamma characteristic 20 and the offset gamma characteristic 21 described above in the first exemplary embodiment, and an example of a corrected gamma characteristic 23 according to the second exemplary embodiment. As illustrated in FIG. 16, the gamma correction amount calculation unit 67 sets the low effective luminance value Ylow as the offset amount for the low luminance area, and sets the high effective luminance value Yhigh as the offset amount for the high luminance area. The gamma correction amount calculation unit 67 further performs correction on the luminance range after the correction according to the offset amounts Ylow and Yhigh by an amount of Δratio corresponding to the illuminance information. In this manner, the corrected gamma characteristic 23 is calculated. As described above, the image processing unit 6 according to the present exemplary embodiment executes processing based not only on the illuminance information but also on the effective luminance value of the object, and thus can appropriately correct the luminance range in accordance with a captured scene for example.

Figure 17:
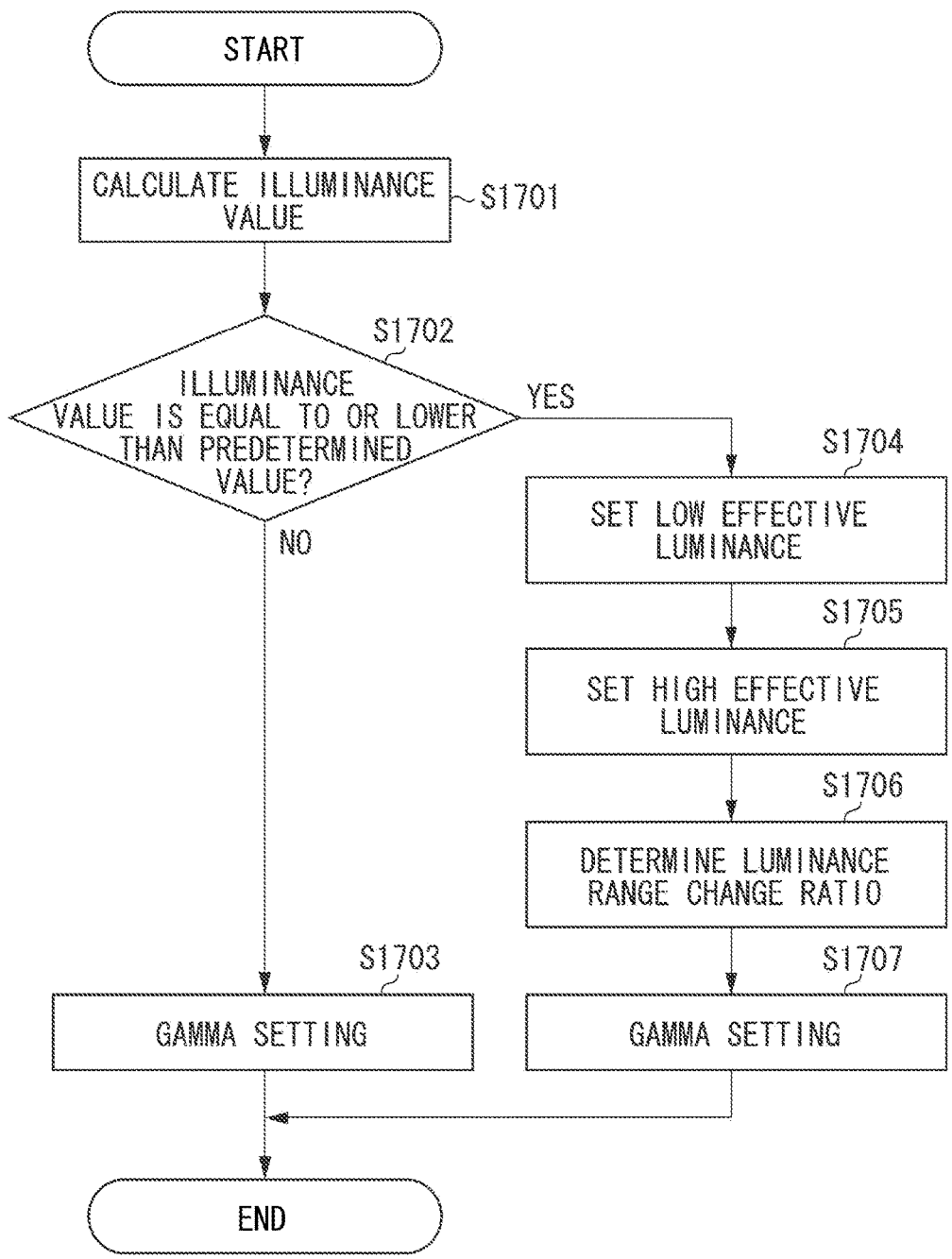
FIG. 17 is a flowchart according to the second exemplary embodiment.

FIG. 17 illustrates a flowchart of processing in the image processing unit 6 according to the present exemplary embodiment. The processing in the flowchart in FIG. 17 is executed by the illuminance calculation unit 65, the gamma correction amount calculation unit 67, and the gamma setting unit 66. The processing illustrated in FIG. 17 may be implemented by a CPU and the like executing an image processing program according to the present exemplary embodiment.

After the camera starts capturing an image, the image processing unit 6 starts the processing in the flowchart illustrated in FIG. 17. Processing in steps S1701 and S1702 is similar to that in steps S1001 and S1002 in FIG. 10 described above, and description thereof will be omitted. In a case where the gamma correction amount calculation unit 67 determines in step S1702 that the illuminance value is equal to or lower than the first illuminance value (Yth1) described above (YES in step S1702), the processing proceeds to step S1704. On the other hand, in a case where the gamma correction amount calculation unit 67 determines in step S1702 that the illuminance value is higher than the first illuminance value (Yth1) described above (NO in step S1702), the processing proceeds to step S1703. In step S1703, the gamma correction amount calculation unit 67 causes the gamma setting unit 66 to set the reference gamma characteristic 20 illustrated in FIG. 5, as in step S1003 in FIG. 10 described above. After the processing step S1703 is completed, the image processing unit 6 terminates the processing in the flowchart illustrated in FIG. 17.

In step S1704, the gamma correction amount calculation unit 67 calculates the cumulative frequency from the low luminance side of the histogram generated by the histogram generation unit 68 as described above, and sets the low effective luminance value Ylow as a value of the luminance Y at which the cumulative frequency Ilow reaches the first frequency. After the processing in step S1704 is completed, the processing proceeds to step S1705. In step S1705, the gamma correction amount calculation unit 67 sets the high effective luminance value Yhigh as a value of the luminance Y at which the cumulative frequency Ihigh calculated from the high luminance side of the histogram reaches the second frequency value. After the processing in step S1705 is completed, the processing proceeds to step S1706.

In step S1706, the gamma correction amount calculation unit 67 determines the change ratio Δratio corresponding to the detected illuminance (i.e., gain) from the plurality of change ratios Δratio of the luminance range corresponding to a different one of the gains as described above. FIG. 18 illustrates relationship between the luminance range change ratios Δratio of and the gains. The gamma correction amount calculation unit 67 according to the present exemplary embodiment determines the luminance range change ratio Δratio corresponding to the detected illuminance (i.e., gain) from the plurality of luminance range change ratios Δratio corresponding to a different one of the gains as illustrated in FIG. 18. Then, the gamma correction amount calculation unit 67 obtains the gamma characteristic 23 as illustrated in FIG. 16 for correcting the luminance range, based on the low effective luminance value Ylow, the high effective luminance value Yhigh, and the luminance range change ratio Δratio as described above.

In the example of the present exemplary embodiment, the correction is performed in such a manner that the luminance range in the high luminance area is compressed by using the luminance range change ratio Δratio. Alternatively, the luminance range may be compressed so that the total of the luminance range change ratio in the low luminance area and high luminance area becomes the luminance range change ratio Δratio. After the processing in step S1706 is completed, the processing proceeds to step S1707.

In step S1707, the gamma correction amount calculation unit 67 causes the gamma setting unit 66 to set the gamma characteristic 23 according to the present exemplary embodiment. Thus, the gamma setting unit 66 corrects the luminance range for the low illuminance image with the gamma characteristic 23. After the processing in step S1707 is completed, the processing in the flowchart illustrated in FIG. 17 is terminated.

Other Exemplary Embodiments

The present invention can also be achieved by the process of supplying a program for implementing one or more functions of the above exemplary embodiments to a system or an apparatus via a network or a storage medium, and causing one or more processors of a computer of the system or the apparatus to read and execute the program. The present invention may be implemented with a circuit (for example, an application specific integrated circuit (ASIC)) that implements at least one function.

The exemplary embodiments described above are merely an example of implementing the present invention, the technical scope of the present invention should not be interpreted as being limited by these exemplary embodiments. Thus, the present invention may be implemented in various ways without departing from the technical concept or the main feature of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-013511, filed Jan. 27, 2016, which is hereby incorporated by reference herein in its entirety.

What is claimed is:

1. An image processing device comprising:
   at least one memory storing at least one program of instructions; and
   at least one processor that executes the at least one program of instructions to implement:
      an illuminance acquisition unit configured to acquire illuminance information indicating an illuminance of an image when the image is captured; and
      a setting unit configured to set a gradation characteristic of a luminance of the image,
      wherein the setting unit sets the gradation characteristic that has a first output luminance range in a case where the illuminance information acquired by the illuminance acquisition unit indicates a first illuminance, and sets the gradation characteristic that has a second output luminance range that is narrower than the first output luminance range in a case where the illuminance information acquired by the illuminance acquisition unit indicates a second illuminance that is lower than a first illuminance.

2. The image processing device according to claim 1, wherein the setting unit is configured
   to obtain, based on the luminance of the captured image, at least one of an effective luminance value on a low luminance side and an effective luminance value on a high luminance side, and
   to set the gradation characteristic based on the obtained effective luminance value and the acquired illuminance information.

3. The image processing device according to claim 2, wherein the setting unit is configured to set a luminance value at which a cumulative frequency from the low luminance side of the captured image becomes a first frequency value as the effective luminance value on the low luminance side, and obtains a luminance value at which a cumulative frequency from the high luminance side of the captured image becomes a second frequency value as the effective luminance value on the high luminance side.

4. The image processing device according to claim 2, wherein in a case where the captured image includes a local high luminance portion, the setting unit is configured to obtain the effective luminance value on the high luminance side with the local high luminance portion being excluded.

5. The image processing device according to claim 2, wherein the setting unit is configured to determine a change ratio corresponding to the detected illuminance, from among a plurality of change ratios set corresponding to respective illuminance values, and to correct the gradation characteristic based on the change ratio determined and the effective luminance value.

6. The image processing device according to claim 1,
   wherein a maximum output luminance value of the second output luminance range is less than a maximum output luminance value of the first output luminance range.

7. The image processing device according to claim 1,
   wherein the setting unit determines a maximum output luminance value of the gradation characteristic in accordance with the illuminance information acquired by the illuminance acquisition unit.

8. The image processing device according to claim 1,
   wherein the setting unit sets the gradation characteristic by correcting a pre-stored reference gradation characteristic in accordance with the illuminance information acquired by the illuminance acquisition unit.

9. The image processing device according to claim 8,
   wherein the setting unit determines a correction characteristic for correcting the reference gradation characteristic in accordance with the illuminance information acquired by the illuminance acquisition unit and corrects, based on the correction characteristic, the reference gradation characteristic.

10. The image processing device according to claim 9, wherein the setting unit is configured to set the gradation characteristic by offsetting at least one of the minimum output luminance value and the maximum output luminance value of the reference gradation characteristic in accordance with the acquired illuminance information, and, after the offsetting is performed, interpolating a luminance value between the minimum output luminance value and the maximum output luminance value.

11. The image processing device according to claim 10, wherein the offsetting raises the minimum output luminance value by a first predetermined amount in a case where the minimum output luminance value is offset, and wherein the offsetting lowers the maximum output luminance value in a case where the maximum output luminance value is offset.

12. The image processing device according to claim 11, wherein the second predetermined amount is larger than the first predetermined amount.

13. The image processing device according to claim 10, wherein an offset amount for at least one of the minimum output luminance value and the maximum output luminance value is increased as the illuminance decreases.

14. The image processing device according to claim 10, wherein the setting unit is configured to set an offset amount for the minimum output luminance value to a value equal to or lower than a predetermined value.

15. An image processing method comprising:
acquiring illuminance information indicating an illuminance of an image when the image is captured; and
setting a gradation characteristic of a luminance of the image,
wherein the setting sets the gradation characteristic that has a first output luminance range in a case where the illuminance information acquired by the acquiring indicates a first illuminance, and sets the gradation characteristic that has a second output luminance range that is narrower than the first output luminance range in a case where the illuminance information acquired by the acquiring indicates a second illuminance that is lower than a first illuminance.

16. A non-transitory computer storage medium storing therein a program that when executed by a computer causes the computer to:
acquire illuminance information indicating an illuminance of an image when the image is captured; and
set a gradation characteristic of a luminance of the image,
wherein the computer sets the gradation characteristic that has a first output luminance range in a case where the illuminance information acquired by the acquiring indicates a first illuminance, and sets the gradation characteristic that has a second output luminance range that is narrower than the first output luminance range in a case where the illuminance information acquired by the acquiring indicates a second illuminance that is lower than a first illuminance.

* * * * *